(12) United States Patent
Zhang et al.

(10) Patent No.: US 9,842,038 B2
(45) Date of Patent: Dec. 12, 2017

(54) METHOD AND SYSTEM FOR ADVANCED FAIL DATA TRANSFER MECHANISMS

(71) Applicant: Advantest Corporation, Tokyo (JP)

(72) Inventors: Xinguo Zhang, Cupertino, CA (US); Yi Liu, San Jose, CA (US); Ze'ev Raz, Los Gatos, CA (US); Darrin Albers, Fort Collins, CO (US); Alan S. Krech, Jr., Fort Collins, CO (US); Shigeo Chiyoda, San Jose, CA (US); Jesse Hobbs, San Jose, CA (US)

(73) Assignee: Advantest Corporation, Tokyo (JP)

( * ) Notice: Subject to any disclaimer, the term of this patent is extended or adjusted under 35 U.S.C. 154(b) by 86 days.

(21) Appl. No.: 14/701,345

(22) Filed: Apr. 30, 2015

(65) Prior Publication Data
US 2016/0321153 A1 Nov. 3, 2016

(51) Int. Cl.
*G06F 11/273* (2006.01)
*G06F 11/22* (2006.01)
*G06F 11/07* (2006.01)

(52) U.S. Cl.
CPC ........ *G06F 11/273* (2013.01); *G06F 11/0778* (2013.01); *G06F 11/22* (2013.01); *G06F 11/2268* (2013.01); *G06F 11/2273* (2013.01)

(58) Field of Classification Search
CPC .... G06F 11/273; G06F 11/2273; G06F 11/22; G06F 11/0778; G06F 11/2268
See application file for complete search history.

(56) References Cited

U.S. PATENT DOCUMENTS

| | | | |
|---|---|---|---|
| 6,421,795 B2 * | 7/2002 | Yamashita | G06F 11/3648 710/59 |
| 6,553,513 B1 | 4/2003 | Swoboda et al. | |
| 7,275,190 B2 | 9/2007 | Roohparvar | |
| 7,281,163 B2 * | 10/2007 | Brown | G06F 11/0778 709/216 |

(Continued)

OTHER PUBLICATIONS

Openmokowiki, Nand Bad Blocks, http://wiki.openmoko.org/wiki/NAND_bad_blocks; Feb. 10, 2012.

(Continued)

*Primary Examiner* — Joseph Kudirka
*Assistant Examiner* — Paul Contino

(57) ABSTRACT

Embodiments of the present invention utilize a dual buffer size threshold system for raising interrupts that allows DUT testing systems to perform real-time buffer memory allocation procedures in an on demand basis. Using dual interrupt threshold systems in the manner described by embodiments of the present invention, DUT testing systems can reduce the need to decide on a single buffer size threshold when testing a set of DUTs that separately provide different amounts of fail data relative to each other. As such, embodiments of the present invention can minimize the overhead processing spent on interrupt handling while also reducing the amount wait time needed for the data processing module to process fail data for each DUT. Thus, embodiments of the present invention can increase the use of tester resources more efficiently while decrease the amount of time a tester system spends collecting and/or analyzing fail data for a set of DUTs during a testing session.

20 Claims, 10 Drawing Sheets

(56) References Cited

U.S. PATENT DOCUMENTS

| | | | | |
|---|---|---|---|---|
| 7,281,240 B1* | 10/2007 | Cantrill | ............... | G06F 11/3466 711/156 |
| 7,496,464 B2* | 2/2009 | Huang | ............... | G05B 23/0256 702/117 |
| 8,286,032 B2* | 10/2012 | Xu | ...................... | G06F 11/3636 714/37 |
| 8,612,650 B1* | 12/2013 | Carrie | ............. | G11B 20/10527 710/52 |
| 8,898,533 B2 | 11/2014 | Christiaens et al. | | |
| 9,117,553 B2 | 8/2015 | Roohparvar | | |
| 9,176,847 B2* | 11/2015 | Malinowski | ........ | G06F 11/0778 |
| 9,396,089 B2* | 7/2016 | Clements | ............ | G06F 11/3476 |
| 9,529,745 B2* | 12/2016 | Atzmon | ............ | G06F 13/1673 |
| 2002/0010882 A1* | 1/2002 | Yamashita | .......... | G06F 11/3636 714/45 |
| 2002/0120815 A1* | 8/2002 | Zahavi | ................ | G06F 11/3034 711/118 |
| 2005/0138473 A1 | 6/2005 | Mathew et al. | | |
| 2005/0160335 A1 | 7/2005 | Peterson | | |
| 2005/0283672 A1* | 12/2005 | Brown | ................ | G06F 11/0778 714/31 |
| 2006/0107186 A1 | 5/2006 | Cowell et al. | | |
| 2007/0225826 A1* | 9/2007 | Huang | ............... | G05B 23/0256 700/11 |
| 2008/0013565 A1 | 1/2008 | Batchelor et al. | | |
| 2009/0157359 A1* | 6/2009 | Chernoff | ................ | G06F 9/542 702/186 |
| 2009/0204949 A1* | 8/2009 | Howland | ............ | G06F 11/3466 717/128 |
| 2010/0017760 A1 | 1/2010 | Kapur et al. | | |
| 2010/0163756 A1* | 7/2010 | McPeak | ........... | G01R 31/31816 250/492.21 |
| 2011/0289349 A1 | 11/2011 | Loeser et al. | | |
| 2011/0307758 A1 | 12/2011 | Fillingim | | |
| 2013/0019128 A1* | 1/2013 | Yamasaki | ........... | G06F 11/0733 714/45 |
| 2013/0055032 A1* | 2/2013 | Cole | ................... | G06F 11/3476 714/45 |
| 2013/0080983 A1 | 3/2013 | Craig et al. | | |
| 2014/0047281 A1 | 2/2014 | Masuo et al. | | |
| 2014/0095946 A1 | 4/2014 | Mozak et al. | | |
| 2014/0244204 A1 | 8/2014 | Frediani | | |
| 2014/0351655 A1* | 11/2014 | Malinowski | ........ | G06F 11/0778 714/45 |
| 2015/0006963 A1* | 1/2015 | Geisert | ............... | G06F 11/0778 714/38.11 |
| 2015/0121150 A1* | 4/2015 | Gamoneda | .......... | G06F 11/3636 714/45 |
| 2015/0135026 A1 | 5/2015 | Lai et al. | | |
| 2015/0242293 A1* | 8/2015 | Segger | .................... | G06F 11/26 714/33 |
| 2015/0243369 A1 | 8/2015 | Zhang et al. | | |
| 2015/0255176 A1 | 9/2015 | Hyder et al. | | |
| 2015/0347265 A1* | 12/2015 | Clements | ............ | G06F 11/3476 714/45 |
| 2016/0321153 A1* | 11/2016 | Zhang | ................... | G06F 11/273 |
| 2017/0031798 A1* | 2/2017 | Clements | ............ | G06F 11/3476 |

OTHER PUBLICATIONS

STMicroelectronics, Bad Block Management in Nand Flash Memories, http://www.eetasia.com/Articles/2004NOV/a/2004NOV29_MEM_AN08.Pdf?Sources=Download) May 2004.

* cited by examiner

Dynamic Buffer Memory Management Procedures Performed by DMA Daemon Module on an Assigned Buffer during a DUT Testing Session Exemplary Activity Levels of the Data Processing Module Monitored by the DMA Daemon Module during a DUT Testing Session Operation 320 of Figure 3A First or "Low" Threshold Mode Procecedures
(Operation 340 of Figure 3B)

Operation 415 of Figure 4A

Second or "High" Threshold Mode Procecedures
(Operation 340 of Figure 3B)

Operation 515 of Figure 5A

METHOD AND SYSTEM FOR ADVANCED FAIL DATA TRANSFER MECHANISMS

FIELD OF THE INVENTION

Embodiments of the present invention generally relate to test equipment devices for testing electronic components.

BACKGROUND

Fail data is critical to verify device under test ("DUT") functionality. Fail data test results can be analyzed and provide information that can be used to repair the DUT by using spare elements or decide whether the device is useful or not. As device density increases, it is very important to achieve test time performance in a production environment.

Within traditional testing architectures, conventional solutions often assign fixed sizes of buffer memory to each DUT to capture its respective fail data. As such, modern testing hardware often uses DMA (direct memory access) mechanisms to store fail data in a memory buffer of a fixed sized that is assigned to a particular a DUT. Thus, when a predefined memory threshold has been reached by a DUT's corresponding memory buffer, the testing hardware generally halts further receipt of fail data from the DUT to process the data. Accordingly, the testing hardware then waits for the data processor to process the fail data stored in the memory buffer before it can send more fail data from the DUT to its corresponding memory buffer.

Thus, the constraints imposed by conventional solutions assigning fixed size buffers often fail to account for different DUTs having different sizes of fail data. In general, fail data is not evenly distributed on all DUTs which can result in some DUTs having significantly more fail data than other DUTs. Accordingly, solutions that require even-memory allocation across DUTs do not provide an efficient means to use test memory resources.

Moreover, conventional solutions for assigning fixed size buffers often have difficulty determining how to set a fixed size threshold for buffers. For instance, if a buffer size threshold is set to a value that is too large and a buffer is full, it will take a long time to process the buffer which can result in processing inefficiencies and memory inefficiencies by allocating too much unused buffer space to the DUTs. If a buffer size threshold is set to a value that is too small, too many interrupts get generated which can cause processing inefficiency due to the overhead needed to process the interrupts. As a result, DMA engines processing fail data stored in the buffers have to pause/resume too many times, which can negatively impact testing performance.

SUMMARY OF THE INVENTION

Accordingly, a need exists for a tester system and/or method that can address the problems described above. Using the beneficial aspects of the systems described, without their respective limitations, embodiments of the present invention provide a novel solution to address these problems.

Embodiments of the present invention utilize a dual buffer size threshold system for raising interrupts that allows DUT testing systems to perform real-time buffer memory allocation procedures in an on demand basis. Using dual interrupt threshold systems in the manner described by embodiments of the present invention, DUT testing systems can reduce the need to decide on a single buffer size threshold when testing a set of DUTs that separately provide different amounts of fail data relative to each other. As such, embodiments of the present invention can minimize the overhead processing spent on interrupt handling while also reducing the amount of wait time needed for the data processor to process fail data for each DUT. Thus, embodiments of the present invention can increase the use of tester resources more efficiently while decrease the amount of time a tester system spends collecting and/or analyzing fail data for a set of DUTs during a testing session.

More specifically, in one embodiment, the present invention is implemented as a method of testing a device under test. The method includes assigning a buffer to each of a plurality of DUTs being tested. The method also includes testing the plurality of DUTs and receiving fail data therefrom into the buffers. Also, the method includes generating an interrupt responsive to a buffer size threshold of a respective buffer being met by a DUT during the testing. In one embodiment, the generating an interrupt further includes monitoring the fail data processing module to determine whether a fail data processing module is idle or busy responsive to the interrupt.

Additionally, the method includes, responsive to the interrupt and provided the buffer size threshold is low and provided a fail data processing module is idle, assigning a subsequent buffer to the DUT for receiving the fail data and adding the respective buffer to a work list of the fail data processing module. In one embodiment, the assigning a subsequent buffer further includes terminating receipt of the fail data in the respective memory buffer upon the buffer size threshold being met by the DUT. In one embodiment, the adding the respective buffer to a work list further includes sending control signals to the fail data processing module to process buffers from the work list.

Also, the method includes, responsive to the interrupt and provided the buffer size threshold is low and the fail data processing module is busy, adjusting the buffer size threshold to a high value. In one embodiment, the high value is set near a maximum buffer capacity level. Additionally, the method includes, responsive to the interrupt and provided the buffer size threshold is high and an idle list of available buffers comprises at least one available buffer, assigning an available buffer to the DUT for receiving the fail data. Furthermore, the method includes, responsive to the interrupt and provided the buffer size threshold is high and the idle list is empty, halting receipt of the fail data for the plurality of DUTs until the idle list includes at least one available buffer.

In one embodiment, the method includes removing the respective buffer from the work list upon the fail data processing module completing processing of the fail data stored in the respective buffer. In one embodiment, the removing further includes adding the respective buffer to the idle list upon the fail data processing module completing processing of the fail data stored in the respective buffer.

In one embodiment, the present invention is implemented as a tester system for testing devices. The system includes a testing engine operable to test a plurality of DUTs and store fail data received therefrom into a plurality of buffers corresponding to the plurality of DUTs, in which the testing engine is operable to generate an interrupt responsive to a buffer size threshold of a respective buffer being met by a DUT during the test. The system also includes a fail data processing module operable to process fail data received from the plurality of DUTs.

Furthermore, the system includes a buffer assigning module operable to assign the plurality of buffers to each of the plurality of DUTs being tested, in which the buffer assigning module is further operable to: responsive to the interrupt and provided the buffer size threshold is low and provided the fail data processing module is idle, assign a subsequent buffer to the DUT for receiving the fail data and add the respective buffer to a work list of the fail data processing module; responsive to the interrupt and provided the buffer size threshold is low and the fail data processing module is busy, adjust the buffer size threshold to a high value; responsive to the interrupt and provided the buffer size threshold is high and an idle list of available buffers includes at least one available buffer, assign an available buffer to the DUT for receiving the fail data; and responsive to the interrupt and provided the buffer size threshold is high and the idle list is empty, halt receipt of the fail data for the plurality of DUTs until the idle list includes at least one available buffer. In one embodiment, the high value is set near a maximum buffer capacity level.

In one embodiment, the buffer assigning module is further operable to terminate receipt of the fail data in the respective memory buffer upon the buffer size threshold being met by the DUT. In one embodiment, the buffer assigning module is further operable to send control signals to the fail data processing module to process buffers from the work list. In one embodiment, the buffer assigning module is further operable to monitor the fail data processing module to determine whether the fail data processing module is idle or busy responsive to the interrupt. In one embodiment, the buffer assigning module is further operable to remove the respective buffer from the work list upon the fail data processing module completing processing of the fail data stored in the respective buffer. In one embodiment, the buffer assigning module is further operable to add the respective buffer to the idle list upon the fail data processing module completing processing of the fail data stored in the respective buffer.

In yet another embodiment, the present invention is implemented as a method of testing a device under test. The method includes assigning a buffer to each of a plurality of DUTs being tested. The method also includes testing the plurality of DUTs and receiving fail data therefrom into the buffers. Additionally, the method includes generating an interrupt responsive to a buffer size threshold of a respective buffer being met by a DUT during the testing. Furthermore, the method includes, responsive to the interrupt, monitoring a fail data processor activity level. Also, the method includes, responsive to the interrupt, monitoring an idle list of available buffers and a work list of the fail data processor.

Additionally, the method includes, responsive to the interrupt, assigning a subsequent buffer to the DUT for receiving the fail data based on the idle list, the work list, the buffer size threshold and the fail data processor activity level. In one embodiment, the assigning a subsequent buffer further includes assigning the subsequent buffer to the DUT provided the fail data processor activity level is idle and the buffer size threshold is low. In one embodiment, the assigning a subsequent buffer further includes adding the respective buffer to the work list of the fail data processor.

Additionally, the method includes, responsive to the interrupt, adjusting the buffer size threshold level to a different level for the respective buffer based on the buffer size threshold level met and the fail data processor activity level. In one embodiment, the adjusting the buffer size threshold level further includes adjusting the buffer size threshold to a high value provided the buffer size threshold is low and the fail data processor activity level is busy. In one embodiment, the high value is set near a maximum buffer capacity level. In one embodiment, the method includes assigning an available buffer to the DUT for receiving the fail data provided the buffer size threshold is high and the idle list comprises at least one available buffer.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Portions of the detailed description that follow are presented and discussed in terms of a process. Although operations and sequencing thereof are disclosed in a figure herein (e.g., FIGS. 3A, 3B, 4A, 4B, 5A, 5B, etc.) describing the operations of this process, such operations and sequencing are exemplary. Embodiments are well suited to performing various other operations or variations of the operations recited in the flowchart of the figure herein, and in a sequence other than that depicted and described herein.

As used in this application the terms controller, module, system, and the like are intended to refer to a computer-related entity, specifically, either hardware, firmware, a combination of hardware and software, software, or software in execution. For example, a module can be, but is not limited to being, a process running on a processor, an integrated circuit, an object, an executable, a thread of execution, a program, and/or a computer. By way of illustration, both an application running on a computing device and the computing device can be a module. One or more modules can reside within a process and/or thread of execution, and a component can be localized on one computer and/or distributed between two or more computers. In addition, these modules can be executed from various computer readable media having various data structures stored thereon.

Figure 1A:
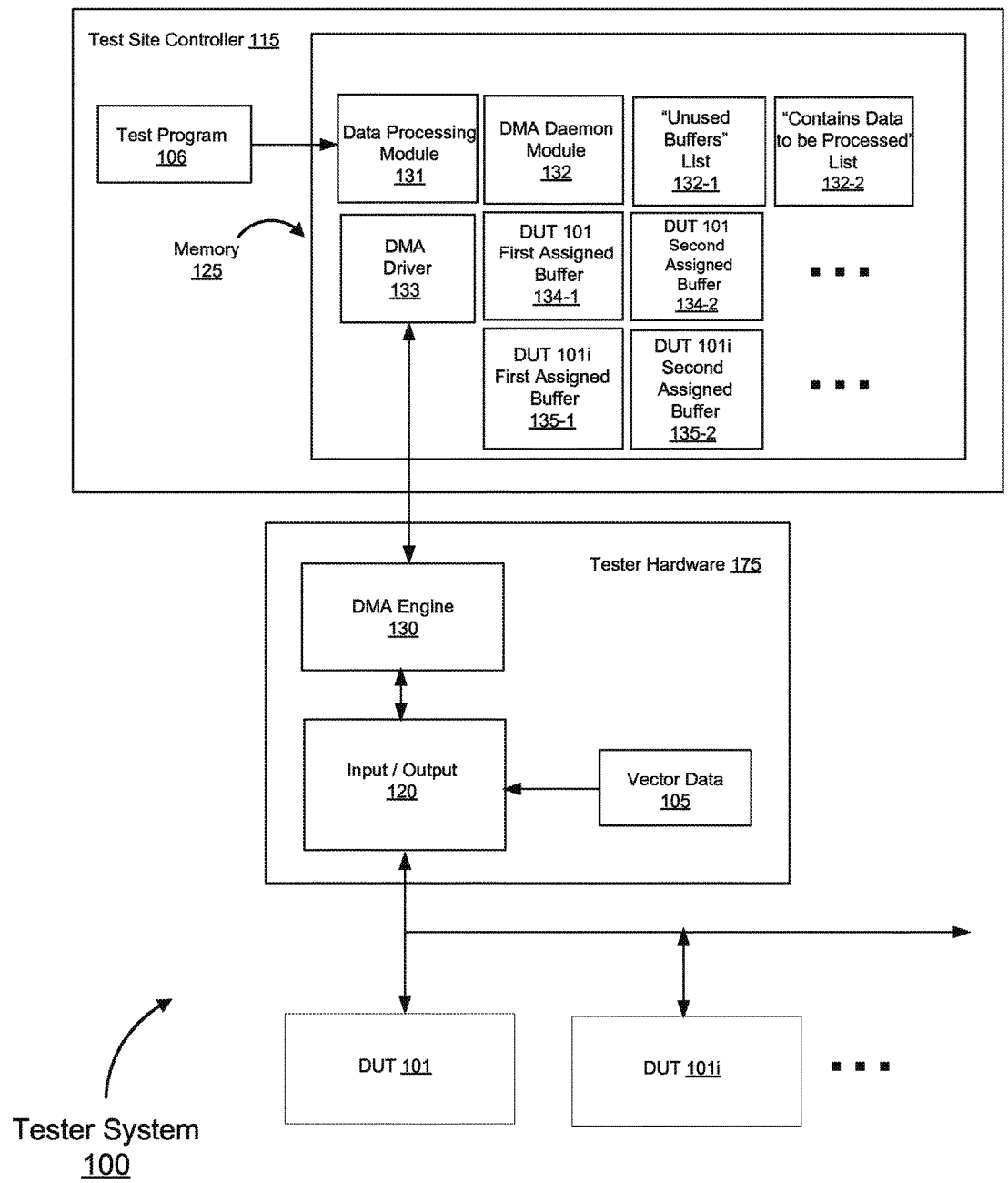
FIG. 1A illustrates an exemplary tester system using a dual interrupt buffer threshold system to dynamically allocate memory buffers to DUTs during a testing session in accordance with embodiments of the present invention.

FIG. 1A depicts a tester system using a dual interrupt threshold system to dynamically allocate memory buffers to DUTs during a testing session in accordance with embodiments of the present invention. As presented in FIG. 1A, an exemplary tester system 100 upon which embodiments of the present invention may be implemented is depicted. In an embodiment, tester system 100 may be implemented within any testing system capable of testing multiple electronic components individually or in parallel.

Test site controller 115 serves as a controller within tester system 100 and can interact with tester hardware 175 via the DMA driver 133. Tester hardware 175 may be capable interfacing with a set of DUTs (e.g., DUTs 101, DUTs 101i, etc.) via input/output 120. As such, in one embodiment, vector data 105 can be received by input/output 120 and stored in memory 125. Test program 130 can be received by data processing module 131 and can contain instructions which provide a number of testing services including test procedures, test result retrieval as well as failure determination analysis using vector data 105. Furthermore, test program 130 may provide synchronization instructions which read and measure testing data at the proper times.

Data processing module 131 reads the instructions from test program 130 and processes fail data received from a set of DUTs (e.g., DUTs 101, DUTs 101i, etc.). In one embodiment, the data processing module 131 includes the functionality to process fail data received from DUTs via the DMA engine 130. As the data processing module 131 processes fail data, it frees up memory within buffers associated with a "work list" or a "contains data to be processed" list (discussed infra), which correspondingly allows the DMA engine 130 to receive more fail data. Moreover, the data processing module 131 can generate or receive signals that enable components of tester system 100 (e.g., the DMA daemon module 132) to monitor its activity level. For instance, the data processing module 131 can generate or receive signals that enable the DMA daemon module 132 to determine whether the data processing module 131 is currently idle or busy processing fail data in a memory buffer assigned by the DMA daemon module 132. According to one embodiment, the data processing module 131 may be executed from user space memory.

According to one embodiment, tester hardware 175 can include DMA engine 130 and input/output 120. As depicted in FIG. 1A, input/output 120 can be used by tester system 100 to receive vector 105. DMA engine 130 includes the functionality to set interrupt threshold values (or "buffer size thresholds") and/or DMA memory buffer sizes. In one embodiment, the DMA engine 130 can set multiple memory buffer size thresholds (e.g., first buffer size thresholds, second buffer size thresholds, etc.) for each memory buffer allocated or assigned by the DMA daemon module 132 prior to a DUT testing session. In one embodiment, the second buffer size threshold set by the DMA engine 130 can be larger or higher than a first buffer size threshold. Moreover, the second buffer size threshold set by the DMA engine 130 can be at a level near a memory buffer's maximum capacity limit. Buffer size thresholds for each assigned memory buffer can be the same or can be different.

Furthermore, the DMA engine 130 includes the functionality to fill each DUT's respective memory buffer (assigned by the DMA daemon module 132) with its corresponding fail data during a DUT testing session. For example, the test site controller 115 can execute test program instructions to test a set of DUTs (e.g., DUT 101, DUT 101i, etc.). As test program instructions are executed, fail data associated with each DUT (e.g., DUT 101 fail data, DUT 101i fail data, etc.) is collected via the DMA engine 130 and stored in each DUT's corresponding memory buffer (e.g., DUT 101 first assigned buffer 134-1, DUT 101 second assigned buffer 134-2, DUT 101i first assigned buffer 135-1, DUT 101i second assigned buffer 135-2, etc.) as determined by the DMA daemon module 132. According to one embodiment, fail data received by each memory buffer assigned by DMA daemon module 132 can be received using a first-in-first-out (FIFO) protocol.

Additionally, the DMA engine 130 can periodically monitor fail data gathered by each memory buffer assigned by the DMA daemon module 132 (e.g., DUT 101 first assigned buffer 134-1, DUT 101 second assigned buffer 134-2, DUT 101i first assigned buffer 135-1, DUT 101i second assigned buffer 135-2, etc.) to determine whether a buffer size threshold (e.g., first buffer size threshold, second buffer size threshold, etc.) has been met. Once the DMA engine 130 determines that a buffer size threshold has been met, it can generate interrupt signals that can be received by other components of tester system 100 (e.g., the DMA daemon module 132) for further processing.

DMA driver 133 includes the functionality to process interrupt signals generated by components within tester system 100 (e.g., the DMA engine 130). For instance, DMA driver 133 can process interrupt signals produced by DMA engine 130 to generate events that can be processed by tester components executed from memory 125 (e.g., data processing module 131). In one embodiment, the DMA driver 133 can be executed from user space memory. In one embodiment, the DMA driver 133 can process interrupt signal generated by the DMA engine 130 at the kernel space level and then communicate signals to the data processing module 131, residing at the user space level, so that it can begin processing fail data.

DMA daemon module 132 includes the functionality to dynamically assign DMA memory buffers for a set of DUTs during a testing session. In one embodiment, DMA daemon module 132 can be executed from user space memory. DMA daemon module 132 also includes the functionality to assign different memory buffers as they become available to a set of different DUTs for storing their respective fail data. In this fashion, the DMA daemon module 132 can dynamically create each memory buffer from a portion of memory 125 for testing DUTs. As such, embodiments of the present invention can avoid the need to assign fixed amounts of memory to each DUT and, thereby, allocate memory to DUTs on an on demand basis. Accordingly, DUTs receiving fail data in excess of its assigned memory buffer can continue to receive fail data in a manner that does not halt the testing session unnecessarily.

Additionally, DMA daemon module 132 includes the functionality to generate an "idle list" or an "unused buffers" list (e.g., "unused buffers" list 132-1) to keep track of unused memory buffers. Unused memory buffers can be portions of memory allocated by Test Site Controller 115 for DUT testing that are not assigned by DMA daemon module 132 to a particular DUT. Also, the DMA daemon module 132 also includes the functionality to generate a "work list" or a "contains data to be processed" list (e.g., "contains data to be processed" list 132-2) to keep track of memory buffers that currently have fail data ready to be processed by the data processing module 131. Using these lists, the DMA daemon module 132 can track memory buffer usage and make determinations as to whether an additional buffer should be assigned to a particular DUT receiving fail data in excess of a previously assigned DMA memory buffer's storage capabilities. In one embodiment, the DMA daemon module 132 can make initial assignment determinations based on both lists. In one embodiment, DMA daemon module 132 can use a data structure to track the availability of memory buffers.

The DMA daemon module 132 can also be configured to perform different DMA memory buffer allocation procedures based on the activity level of the data processing module 131. As described herein, the DMA daemon module 132 includes the functionality to monitor the status of the data processing module 131 to determine if it is currently idle or busy processing data in one of the memory buffers assigned by the DMA daemon module 132. In this fashion, based on the activity level of the data processing module 131, the DMA daemon module 132 can communicate control signals to the data processing module 131 to begin processing fail data stored in an assigned memory buffer meeting a pre-determined buffer size threshold set by the DMA engine 130. According to one embodiment, the DMA daemon module 132 can check the "contains data to be processed" list to make determinations as to whether the data processing module 131 is busy or idle when a particular buffer size threshold has been reached. For instance, in one embodiment, when the "contains data to be processed" list is empty, the DMA daemon module 132 can determine that the data processing module 131 is "idle". Alternatively, when the "contains data to be processed" list is not empty, the DMA daemon module 132 can determine that the data processing module 131 is "busy".

The DMA daemon module 132 can also make determinations as to whether the "unused buffers" list contains any memory buffers that are not currently assigned to a DUT. Using this list, the DMA daemon module 132 can assign available DMA memory buffers as an additional memory buffer (e.g., second assigned memory buffer, third assigned memory buffer, etc.) to a DUT that continues to receive fail data despite the memory size constraints of its previous or originally assigned memory buffer.

Moreover, the DMA daemon module 132 can also be configured to perform different DMA memory buffer allocation procedures based on an assigned DMA memory buffer receiving an amount of fail data that meets a pre-determined buffer size threshold (e.g., a first buffer size threshold, second buffer size threshold, etc.). For instance, the DMA daemon module 132 can perform procedures that temporarily halt the receipt of fail data by one or more DMA memory buffers when a memory buffer reaches a particular buffer size threshold. In this fashion, the DMA daemon module 132 can suspend the collection of fail data in different assigned DMA memory buffers until the data processing module 131 frees up at least one memory buffer for the DMA daemon module 132 to use when performing memory buffer reallocation procedures (e.g., providing a DUT with an additional DMA memory buffer).

Additionally, the DMA daemon module 132 can be configured to adjust buffer size thresholds based on the "contains data to be processed" list. For example, in one embodiment, upon a determination that the data processing module 131 is "idle," the DMA daemon module 132 can be configured to adjust the buffer size threshold to a lower threshold value. Alternatively, upon a determination that the data processing module 131 is "busy," the DMA daemon module 132 can be configured to adjust the buffer size threshold to a higher threshold value. In this fashion, the DMA daemon module 132 can have more computational resources devoted to performing one task (e.g., DMA memory buffer allocation determinations) rather than of dividing its resources between two or more tasks (e.g., DMA memory buffer allocation determinations and monitoring the activity level of the data processing module 131). Moreover, embodiments of the present invention can avoid spending onerous amounts of time handling numerous interrupt signals which can negatively affect testing performance and also unnecessarily waste tester resources.

Table I provides exemplary computer-implemented instructions for purposes of dynamically allocating memory buffers to DUTs during a testing session in accordance with embodiments of the present invention:

TABLE I

IF interrupt threshold = threshold_low THEN
   If IsIdle(DataProcessor) THEN
      Assign new block to bridge
      Add filled block to work list
      Wake up DataProcessor
   ELSE TABLE I-continued

```
        Change interrupt threshold to threshold_high
      END IF
    ELSE ### interrupt threshold = threshold_high
      IF empty block available THEN
        Assign new block to bridge
        Add filled block to work list
      ELSE
        Wait for empty block
      END IF
    END IF
```

Figure 1B:
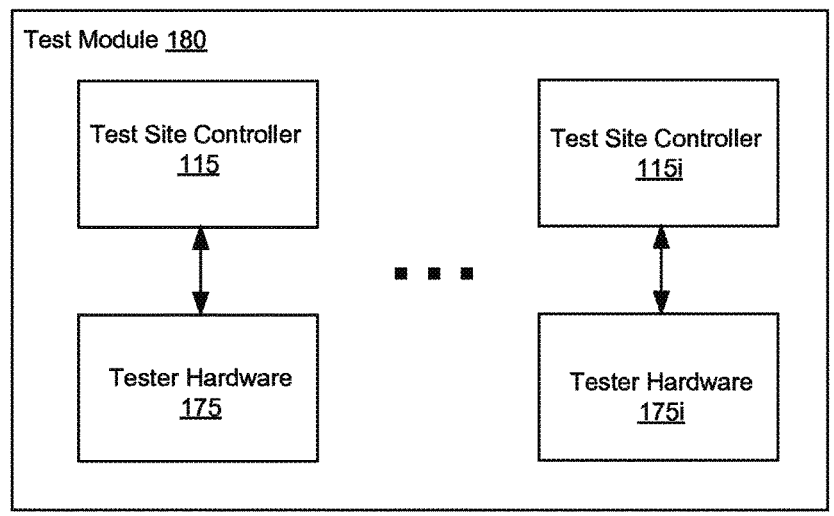
FIG. 1B illustrates an exemplary tester system configuration using a dual interrupt buffer threshold system to dynamically allocate memory buffers to DUTs during a testing session in accordance with embodiments of the present invention.
Figure 1C:
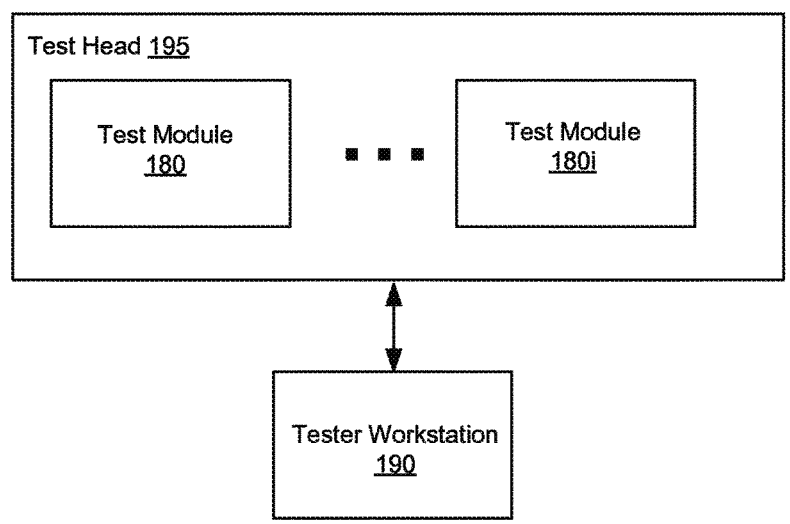
FIG. 1C illustrates another exemplary tester system configuration using a dual interrupt buffer threshold system to dynamically allocate memory buffers to DUTs during a testing session in accordance with embodiments of the present invention.

FIGS. 1B and 1C depict additional tester system configurations in accordance with embodiments of the present invention. As illustrated by FIG. 1B, a test module (e.g., test module 180) can be configured to include a number of different test site controllers (e.g., test site controller 115, test site controller 115i, etc.) that are each coupled to separate test hardware systems (e.g., tester hardware 175, tester hardware 175i, etc.). In this fashion, with reference to the embodiment depicted in FIG. 1C, a number of different test modules (e.g., test module 180, test module 180i, etc.) can be stored within a test head (e.g., test head 195) that is coupled to a tester workstation (e.g., tester workstation 190). Using tester workstations in this manner enables embodiments of the present invention to focus more on failure analysis and perform DUT testing in a more efficient manner. Moreover, test head 195 can be configured to provide tester workstation 190 with a number of different tester resources during the performance of DUT testing.

Figure 2A:
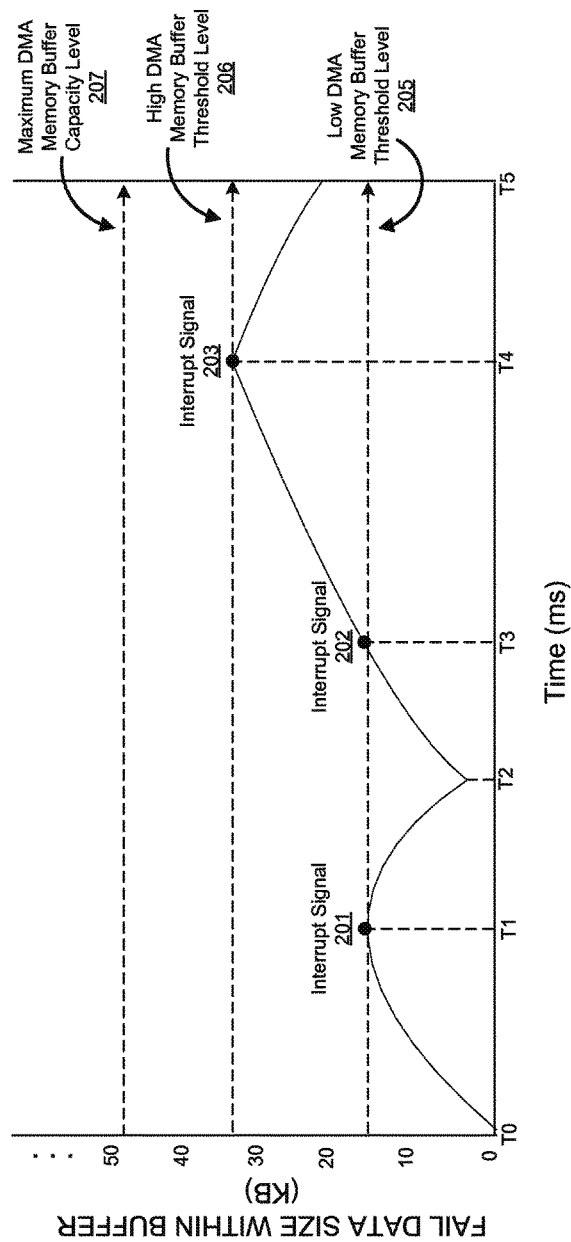
FIG. 2A is a graphical representation of an embodiment of the present invention that uses a dual interrupt buffer threshold system to dynamically allocate memory buffers to DUTs during a testing session in accordance with embodiments of the present invention.
Figure 2B:
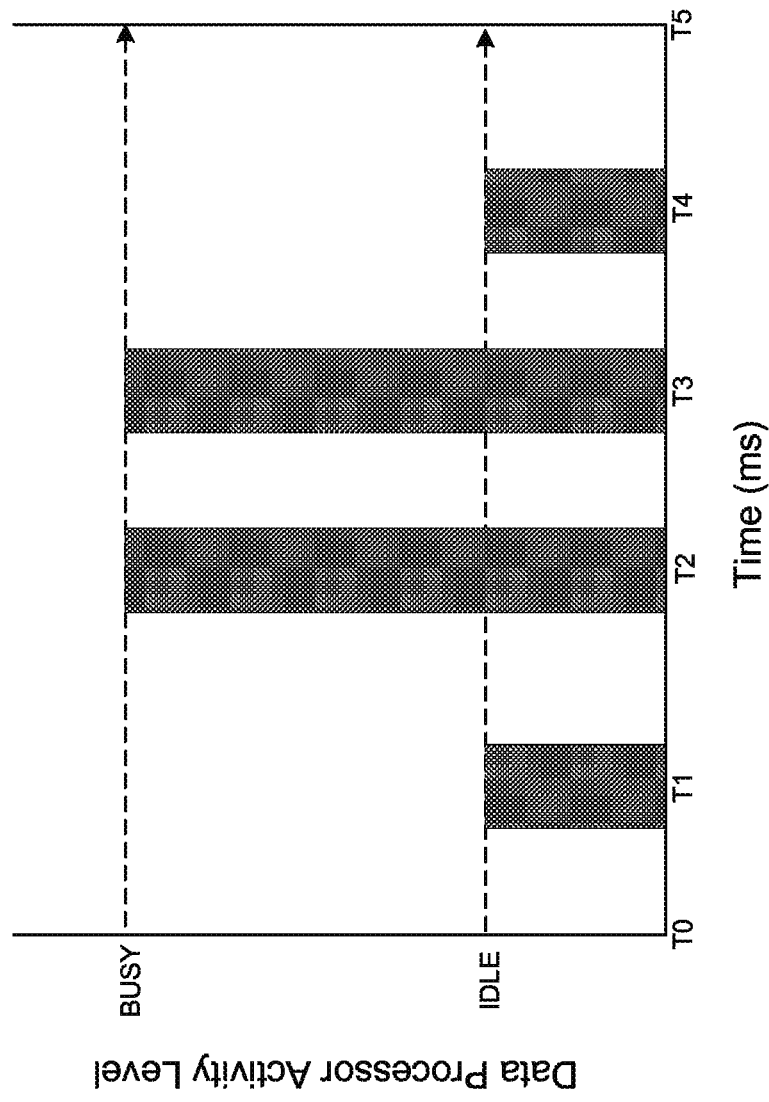
FIG. 2B is another graphical representation of an embodiment of the present invention that uses a dual interrupt buffer threshold system to dynamically allocate memory buffers to DUTs during a testing session in accordance with embodiments of the present invention.

FIGS. 2A and 2B are graphical representations of the manner in which embodiments of the present invention can use a dual interrupt threshold system to dynamically allocate memory buffers to DUTs during a testing session in accordance with embodiments of the present invention. As illustrated by FIGS. 2A and 2B, a tester system (e.g., tester system 100) may be configured to dynamically allocate memory buffers to a particular DUT (e.g., DUT 101) based on the data processing module 131's activity level as well as different memory buffer thresholds being met by DUT 101's assigned memory buffer (e.g., assigned by DMA daemon module 132 prior to DUT 101's testing session).

FIG. 2A depicts various different levels of fail data gathered by the DUT 101's first assigned memory buffer during a testing session occurring between times T0 to T5. During this testing session, the DMA engine 130 can generate several interrupt signals (e.g., interrupt signals 201, 202, 203) at various times (e.g., T1, T3, T4) in response to detected DMA memory buffer thresholds being met by DUT 101's first assigned memory buffer. Additionally, FIG. 2A depicts a first DMA memory buffer threshold level (e.g., low DMA memory buffer threshold level 205), a second DMA memory buffer threshold level (e.g., high DMA memory buffer threshold level 206), and a maximum DMA memory buffer capacity level (e.g., maximum DMA memory buffer capacity level 207).

As described herein, the DMA engine 130 can set the values for low DMA memory buffer threshold level 205, high DMA memory buffer threshold level 206, as well as maximum DMA memory buffer capacity level 207 prior to the testing session. Also, as depicted in FIG. 2A, high DMA memory buffer threshold level 206 can be larger than low DMA memory buffer threshold level 205. Moreover, high DMA memory buffer threshold level 206 can be at a level near maximum DMA memory buffer capacity level 207. Although 2 DMA memory buffer threshold levels are depicted in FIG. 2A, embodiments of the present invention can support more or less DMA memory buffer threshold levels.

With reference now to FIG. 2B, in response to the generation of interrupt signal 201 in FIG. 2A, DMA daemon module 132 determines whether the data processing module 131 is currently idle or busy processing data at T1 (e.g., processing data in one of the memory buffers assigned by the DMA daemon module 132). As depicted in FIG. 2B, the DMA daemon module 132 determined at T1 that the data processing module 131 is idle and, therefore, sends control signals to the data processing module 131 to begin processing the fail data stored in DUT 101's first assigned memory buffer. Also, at T1, the DMA daemon module 132 determines that the "unused buffers" list contains at least one memory buffer (not pictured) and, therefore, the DMA daemon module 132 assigns the available memory buffer as a second memory buffer to DUT 101. Accordingly, the DMA daemon module 132 communicates control signals to the DMA engine 130 that instruct it to immediately collect fail data in the second memory buffer assigned at T1 to DUT 101.

As illustrated between times T1 and T2 in FIG. 2A, the amount of fail data stored in DUT 101's first assigned memory buffer decreases as excess fail data (fail data generated beyond the memory constraints of a previously assigned memory buffer) associated with DUT 101 is collected in the second memory buffer assigned to DUT 101 by the DMA daemon module 132 at T1. Additionally, as depicted between times T1 and T2, the data processing module 131 processes the fail data stored in DUT 101's first assigned memory buffer in manner that also reduces the amount of fail data previously stored in the buffer from T0 up until T1. In this fashion, the data processing module 131 can free up DMA memory buffers by processing the fail data so that the DMA daemon module 132 can subsequently use them to provide other DUTs with additional DMA memory buffers as needed. Therefore, embodiments of the present invention allow DUTs to continue to receive fail data during a testing session with minimal halting periods, despite the memory size constraints of their respective assigned memory buffers.

Also, as illustrated in FIG. 2B, the data processing module 131 is busy at times T2 and T3. Thus, had the DMA daemon module 132 processed interrupt signals generated at these times, the DMA daemon module 132 could be configured to withhold sending control signals to the data processing module 131 to begin processing the fail data stored in DUT 101's first assigned memory buffer. Thus, in lieu of sending these control signals, the DMA daemon module 132 would instead perform procedures to determine whether the "unused buffer" list contains at least one memory buffer for purposes of performing the memory buffer reassignment operations described herein. Thus, when an interrupt is generated, the DMA daemon module 132 can perform a number of different procedures. For instance, if a "contains data to be processed" list is empty, DMA daemon module 132 can grab a buffer from the "unused buffers" list and assign it to the DMA engine 130 so that testing may continue. However, if the "contains data to be processed" list is not empty and the current threshold value is set to a low threshold value, DMA daemon module 132 can change the current threshold value to a high threshold value so that testing may continue. Also, if the "contains data to be processed" list is not empty and the current threshold value is set to a high threshold value and the "unused buffers" list is empty, the DMA daemon module 132 can halt or pause DUT testing procedures until the "unused buffers" list is no longer empty. Moreover, if the "contains data to be processed" list is not empty and the current threshold value is set to a high threshold value, the DMA daemon module 132 can grab a buffer from the "unused buffers" list and assign it to DMA engine 130, while setting or maintaining the current threshold value to a high threshold value so that testing may continue.

As such, the DMA daemon module 132 can be configured to wait for the DMA engine 130 to generate another interrupt signal responsive to a second DMA memory buffer threshold level (e.g., high DMA memory buffer threshold level 206) being met. In this manner, embodiments of the present invention can avoid spending onerous amounts of time handling numerous interrupt signals which can negatively affect testing performance and also unnecessarily waste tester resources.

As illustrated at T4, the DMA engine 130 generates interrupt signal 203 upon detecting that the high DMA memory buffer threshold level 206 has been met by DUT 101's first assigned memory buffer. With reference now to FIG. 2B, in response to the generation of interrupt signal 203 in FIG. 2A, DMA daemon module 132 determines whether the data processing module 131 is currently idle or busy processing data at T4. As depicted in FIG. 2B, the DMA daemon module 132 determined at T4 that the data processing module 131 is idle and, therefore, sends control signals to the data processing module 131 to begin processing the fail data stored in DUT 101's first assigned memory buffer. Also, at T4, the DMA daemon module 132 determines that the "unused buffer" list contains at least one memory buffer (not pictured) and, therefore, the DMA daemon module 132 assigns the available memory buffer as a third memory buffer to DUT 101. Accordingly, the DMA daemon module 132 communicates control signals to the DMA engine 130 that instruct it to immediately collect fail data in the third memory buffer assigned at T4 to DUT 101.

Thus, similar to the time period between T1 and T2, the amount of fail data previously stored in DUT 101's first assigned memory buffer between times T3 and T4 decreases as excess fail data associated with DUT 101 is collected in the third memory buffer assigned to DUT 101 at T4 and as the data processing module 131 frees up the memory buffer by processing the stored fail data.

In this fashion, embodiments of the present invention can maintain manageable levels of fail data collection within memory buffers such that each DUT can have its respective fail data processed in an efficient manner during a test session without a need to have uniform levels of memory allocated to each DUT. Furthermore, embodiments of the present invention can shorten the amount of wait periods that are needed for processing fail data in each memory buffer, which can unnecessarily prolong DUT testing sessions.

Figure 3A:
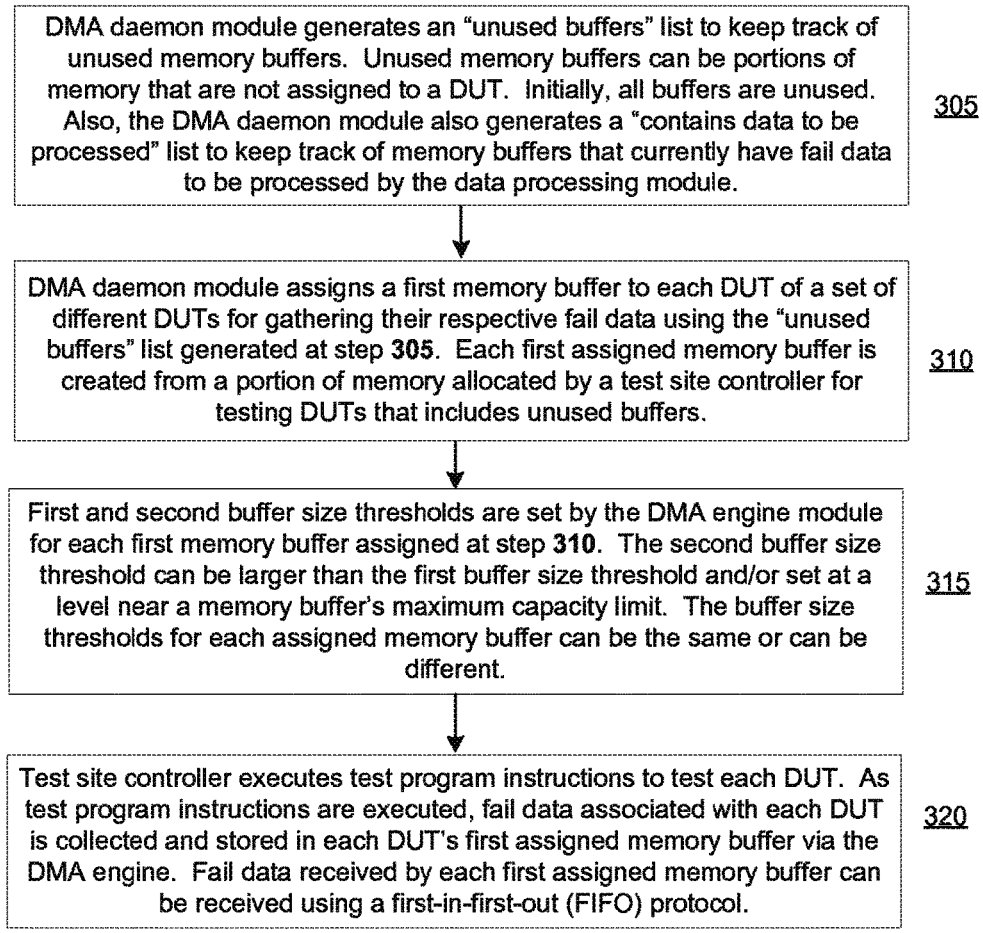
FIG. 3A is a flowchart which describes exemplary computer-implemented operations of dynamically allocating memory buffers to a DUT to collect fail data based on a data processing module's activity level and/or detected memory buffer thresholds being met in accordance with embodiments of the present invention.

FIG. 3A presents a flowchart which describes exemplary computer-implemented operations of dynamically allocating memory buffers to a DUT to collect fail data based on a data processing module's activity level and/or detected memory buffer thresholds being met in accordance with embodiments of the present invention.

At step 305, the DMA daemon module generates an "unused buffers" list to keep track of unused memory buffers. Unused memory buffers can be portions of the memory allocated at step 305 that are not assigned to a DUT. Initially, all buffers are unused. The DMA daemon module also generates a "contains data to be processed" list to keep track of memory buffers that currently have fail data to be processed by the data processing module.

At step 310, the DMA daemon module assigns a first memory buffer to each DUT of a set of different DUTs for gathering their respective fail data using the "unused buffers" list generated at step 305. Each first assigned memory buffer is created from a portion of memory allocated by a test site controller for testing DUTs that includes unused buffers.

At step 315, first and second buffer size thresholds are set by the DMA engine module for each first memory buffer assigned at step 310. The second buffer size threshold can be larger than the first buffer size threshold and/or set at a level near a memory buffer's maximum capacity limit. The buffer size thresholds for each assigned memory buffer can be the same or can be different.

At step 320, the test site controller executes test program instructions to test each DUT. As test program instructions are executed, fail data associated with each DUT is collected and stored in each DUT's first assigned memory buffer via the DMA engine. Fail data received by each first assigned memory buffer can be received using a first-in-first-out (FIFO) protocol.

Figure 3B:
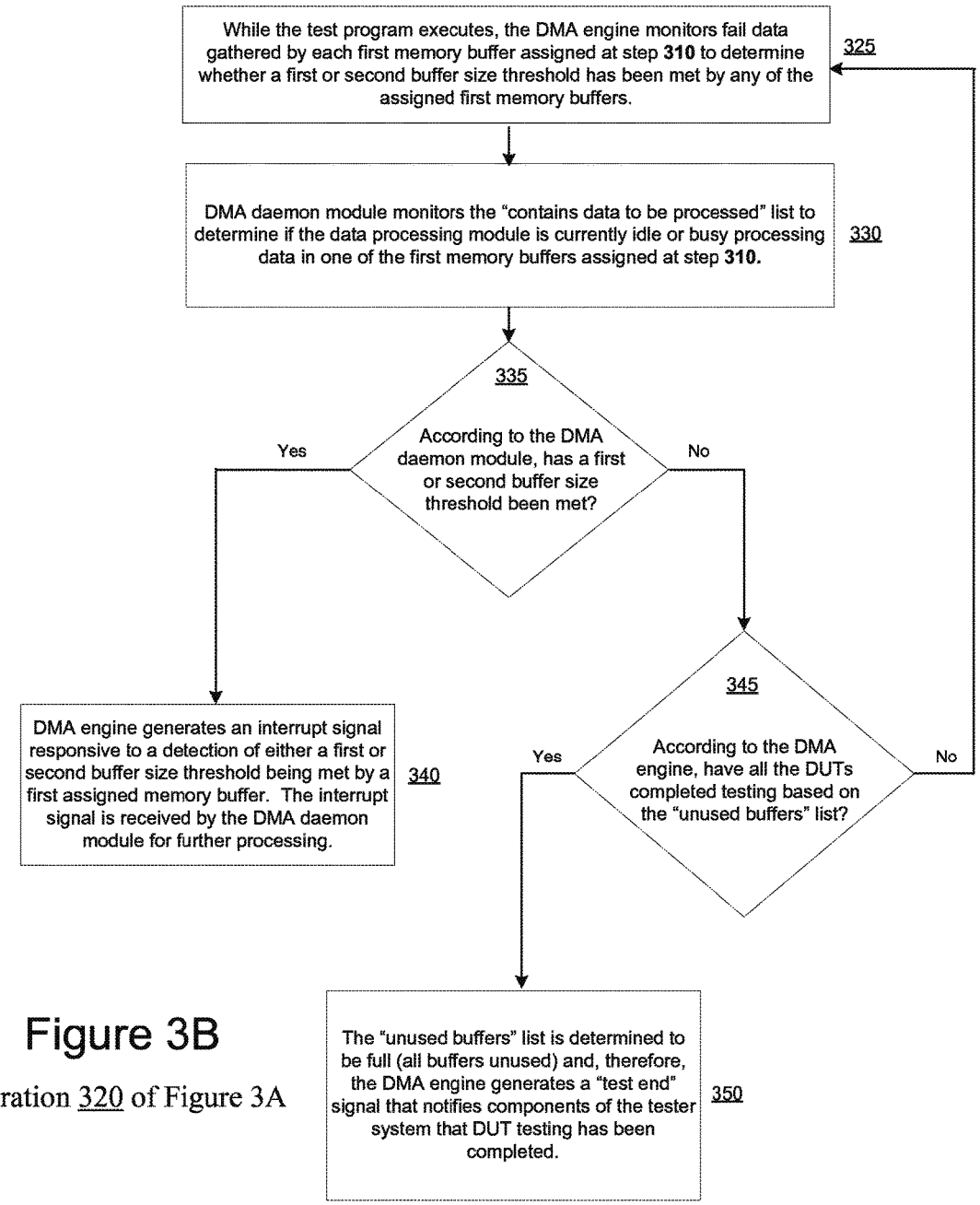
FIG. 3B is another flowchart which describes exemplary computer-implemented operations of dynamically allocating memory buffers to a DUT to collect fail data based on a data processing module's activity level and/or detected memory buffer thresholds being met in accordance with embodiments of the present invention.

FIG. 3B presents a flowchart which describes exemplary computer-implemented operations of dynamically allocating memory buffers to a DUT to collect fail data based on a data processing module's activity level and/or detected memory buffer thresholds being met in accordance with embodiments of the present invention. The details of operation 320 (see FIG. 3A) are outlined in FIG. 3B.

At step 325, while the test program executes, the DMA engine monitors fail data gathered by each first memory buffer assigned at step 310 (See FIG. 3A) to determine whether a first or second buffer size threshold has been met by any of the assigned first memory buffers.

At step 330, the DMA daemon module monitors the "contains data to be processed" list to determine if the data processing module is currently idle or busy processing data in one of the first memory buffers assigned at step 310.

At step 335, a determination is made by the DMA engine as to whether a first or second buffer size threshold has been met by a first assigned memory buffer. If a first or second buffer size threshold has been met by a first assigned memory buffer, then the DMA engine generates an interrupt signal, as detailed at step 340. If a first or second buffer size threshold has not been met by a first assigned memory buffer, then a determination is made by DMA engine as to whether all DUTs have completed the testing session based on the "unused buffers" and "contains data to be processed" lists generated at step 310 (see FIG. 3A), as detailed at step 345.

At step 340, the DMA engine generates an interrupt signal responsive to a detection of either a first or second buffer size threshold being met by a first assigned memory buffer. The interrupt signal is received by the DMA daemon module for further processing.

At step 345, a first or second buffer size threshold has not been met by a first assigned memory buffer and, therefore, a determination is made by DMA engine as to whether all DUTs have completed the testing session based on the "unused buffers" list generated at step 310. If the "unused buffers" list is determined to be full (all buffers are unused), the DMA engine determines that all DUTs have completed testing and, therefore, the DMA engine generates a "test end" signal that notifies components of the tester system that DUT testing has been completed, as detailed at step 350. If the "unused buffers" list is determined to be not full, then the DMA engine continues to monitor fail data gathered by each first memory buffer assigned at step 310, as detailed at step 325.

At step 350, the "unused buffers" list is determined to be full thereby indicating that all DUTs have completed testing and, therefore, the DMA engine generates a "test end" signal that notifies components of the tester system that DUT testing has been completed.

Figure 4A:
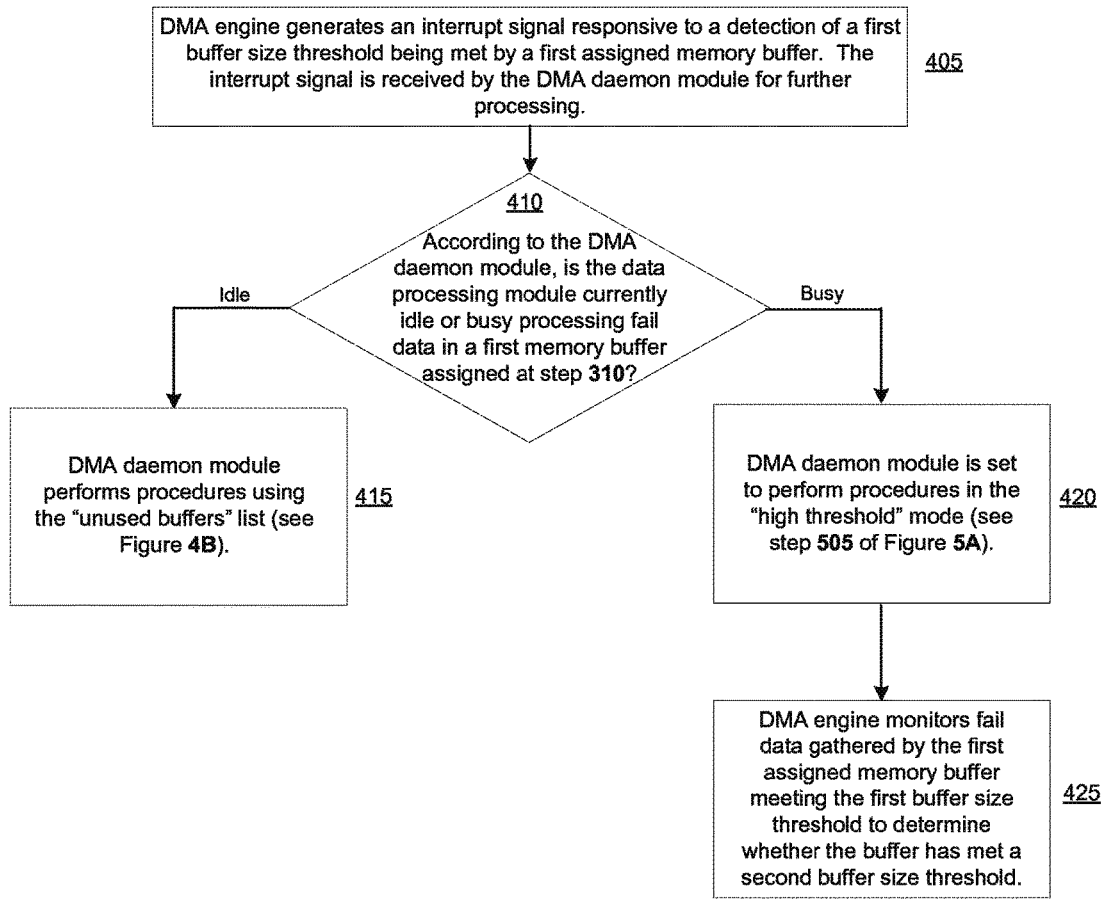
FIG. 4A is a flowchart which describes exemplary computer-implemented operations of dynamically allocating memory buffers to a DUT to collect fail data based on a data processing module's activity level and a first threshold being met by an assigned memory buffer in accordance with embodiments of the present invention.

FIG. 4A presents a flowchart which describes exemplary computer-implemented operations of dynamically allocating memory buffers to a DUT to collect fail data based on a data processing module's activity level and a first threshold being met by an assigned memory buffer in accordance with embodiments of the present invention. The details of operation 340 (see FIG. 3B) are outlined in FIG. 4.

At step 405, the DMA engine generates an interrupt signal responsive to a detection of a first buffer size threshold being met by a first assigned memory buffer. The interrupt signal is received by the DMA daemon module for further processing.

At step 410, a determination is made by the DMA daemon module to see if the data processing module is currently idle or busy processing fail data in a first memory buffer assigned at step 310 (see FIG. 3A). If the data processing module is currently idle, then the DMA daemon performs procedures using the "unused buffers", as detailed at step 415. If the data processing module is busy processing fail data in a first memory buffer assigned at step 310, then the DMA daemon module is set to perform procedures in the "high" threshold mode, as detailed at step 420.

Figure 4B:
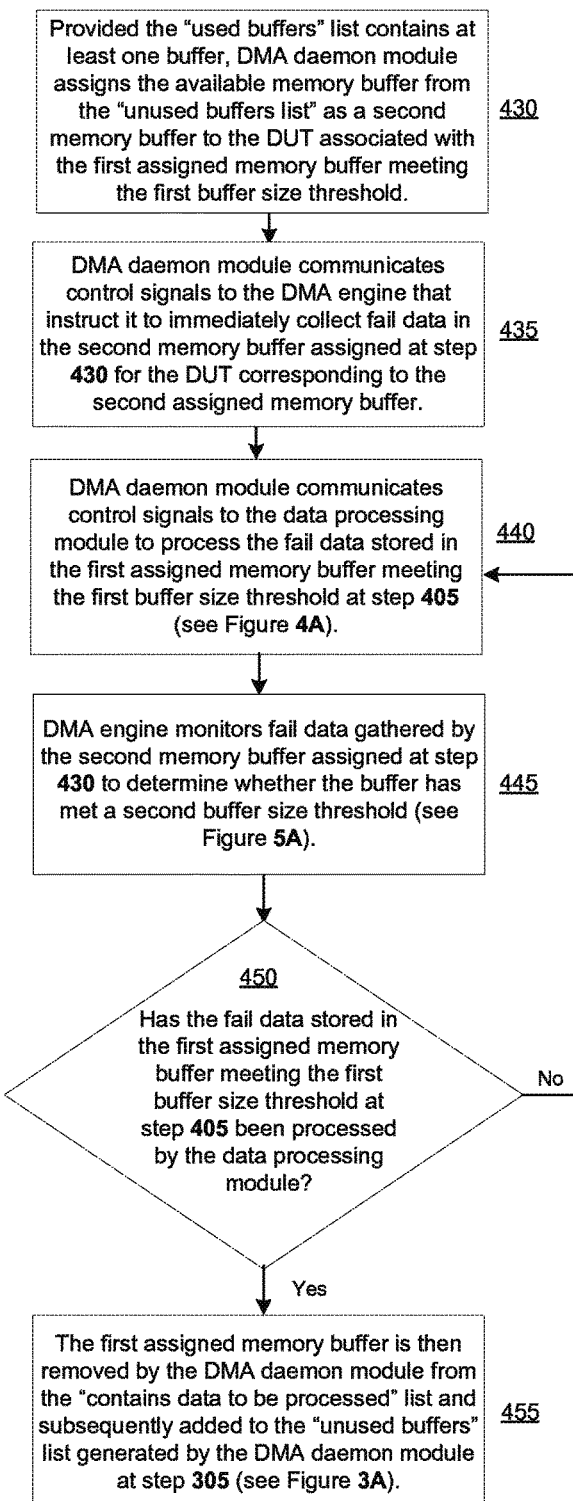
FIG. 4B is another flowchart which describes exemplary computer-implemented operations dynamically allocating memory buffers to a DUT to collect fail data based on a data processing module's activity level and a first threshold being met by an assigned memory buffer in accordance with embodiments of the present invention.

At step 415, the DMA daemon module determines that the data processing module is currently idle and, therefore, the DMA daemon performs procedures using the "unused buffers" list (see FIG. 4B).

Figure 5A:
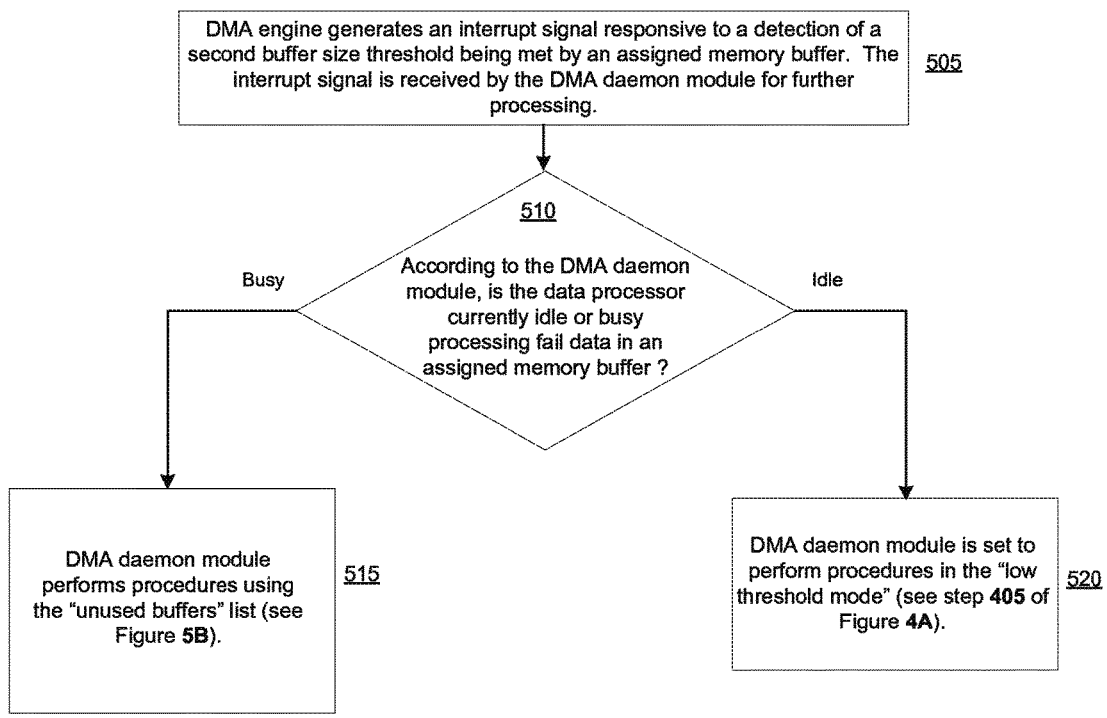
FIG. 5A is a flowchart which describes exemplary computer-implemented operations of dynamically allocating memory buffers to a DUT to collect fail data based on a data processing module's activity level and a second threshold being met by an assigned memory buffer in accordance with embodiments of the present invention.

At step 420, the data processing module is determined to be busy processing fail data in a first memory buffer assigned at step 310 and, therefore, the DMA daemon module is set to perform procedures in the "high" threshold mode (see step 505 of FIG. 5A).

At step 425, the DMA engine monitors fail data gathered by the first assigned memory buffer meeting the first buffer size threshold to determine whether the buffer has met a second buffer size threshold.

FIG. 4B presents a flowchart which describes exemplary computer-implemented operations of dynamically allocating memory buffers to a DUT to collect fail data based on a data processing module's activity level and a first threshold being met by an assigned memory buffer in accordance with embodiments of the present invention. The details of operation 415 (see FIG. 4A) are outlined in FIG. 4B.

At step 430, provided the "unused buffers" list contains at least one buffer, the DMA daemon module assigns the available memory buffer as a second memory buffer to the DUT associated with the first assigned memory buffer meeting the first buffer size threshold.

At step 435, the DMA daemon module communicates control signals to the DMA engine that instruct it to immediately collect fail data in the second memory buffer assigned at step 430 for the DUT corresponding to the second assigned memory buffer. Also, the DMA daemon module adds the second memory buffer assigned at step 430 to the "contains data to be processed" list generated by the DMA daemon module at step 305 (see FIG. 3A).

At step 440, the DMA daemon module communicates control signals to the data processing module to process the fail data stored in the first assigned memory buffer meeting the first buffer size threshold at step 405 (see FIG. 4A).

At step 445, the DMA engine monitors fail data gathered by the second memory buffer assigned at step 430 to determine whether the buffer has met a second buffer size threshold. Upon a determination that the buffer has met a second buffer size threshold, the DMA engine generates an interrupt signal responsive to a detection of a second buffer size threshold being met by an assigned memory buffer, as detailed at step 505 (see FIG. 5A).

At step 450, a determination is made by the DMA engine as to whether the fail data stored in the first assigned memory buffer meeting the first buffer size threshold at step 405 been processed by the data processing module. If the first assigned memory buffer meeting the first buffer size threshold has not been processed, then the data processing module continues to process the fail data stored in the first assigned memory buffer, as detailed at step 440. If the first assigned memory buffer meeting the first buffer size threshold has been processed, then this memory buffer is then removed from the "contains data to be processed" list and subsequently added to the "unused buffer" list generated by the DMA daemon module at step 305 (see FIG. 3A), as detailed at step 470.

At step 455, the first assigned memory buffer meeting the first buffer size threshold has been completely processed and, therefore, the first assigned memory buffer is then removed by the DMA daemon module from the "contains data to be processed" list and subsequently added to the "unused buffers" list generated by the DMA daemon module at step 305 (see FIG. 3A).

FIG. 5A presents a flowchart which describes exemplary computer-implemented operations of dynamically allocating memory buffers to a DUT to collect fail data based on a data processing module's activity level and a second threshold being met by an assigned memory buffer in accordance with embodiments of the present invention. The details of operation 340 (see FIG. 3B) are outlined in FIG. 5A.

At step 505, the DMA engine generates an interrupt signal responsive to a detection of a second buffer size threshold being met by an assigned memory buffer. The interrupt signal is received by the DMA daemon module for further processing.

At step 510, a determination is made by the DMA daemon module to see if the data processing module is busy processing fail data in an assigned memory buffer or currently idle. If the data processing module is busy processing fail data, then the DMA daemon module performs procedures using the "unused buffers" list, as detailed at step 515. If the data processing module is currently idle, then the DMA daemon module is set to perform procedures in the "low threshold mode," as detailed at step 520.

Figure 5B:
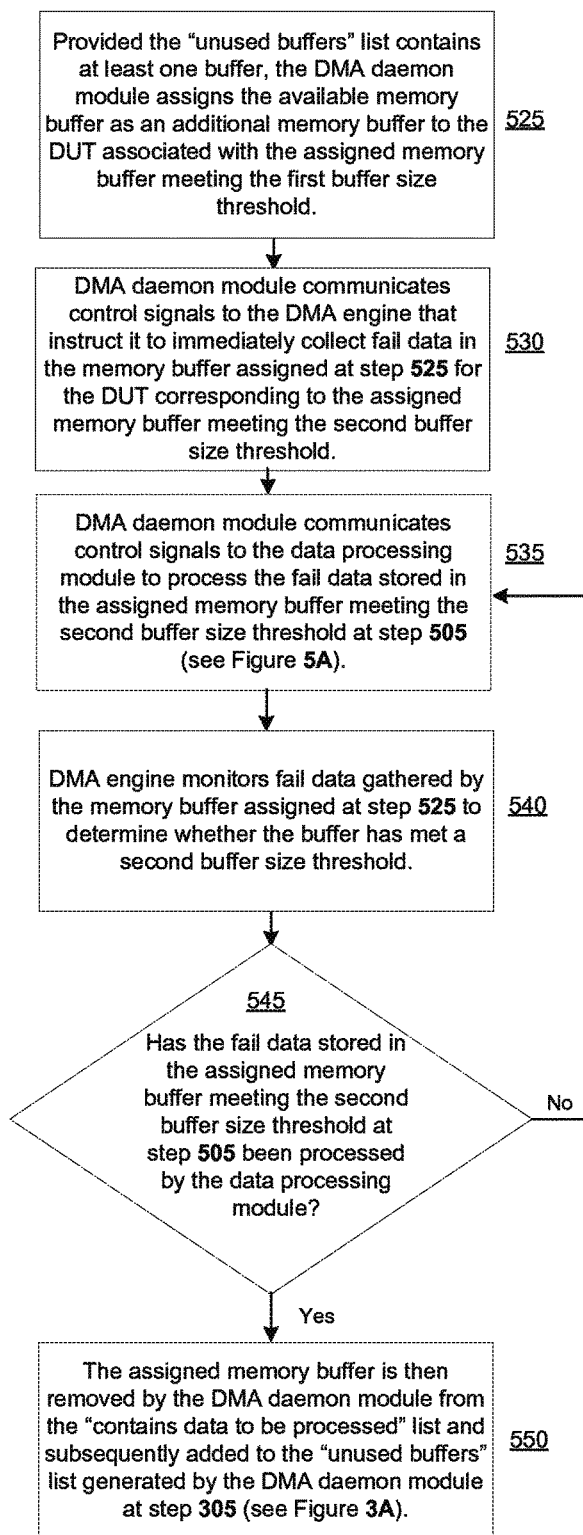
FIG. 5B is another flowchart which describes exemplary computer-implemented operations of dynamically allocating memory buffers to a DUT to collect fail data based on a data processing module's activity level and a second threshold being met by an assigned memory buffer in accordance with embodiments of the present invention.

At step 515, the DMA daemon module determines that the data processing module is busy processing fail data and, therefore, the DMA daemon module performs procedures using the "unused buffers" list (see FIG. 5B).

At step 520, the data processing module is determined to be currently idle and, therefore, the DMA daemon module is set to perform procedures in the "low threshold mode" and configured to wait for interrupt signals generated by the DMA engine responsive to a detection of a first buffer size threshold being met by an assigned memory buffer in the manner described for first assigned memory buffers (see step 405 of FIG. 4A).

FIG. 5B presents a flowchart which describes exemplary computer-implemented operations of dynamically allocating memory buffers to a DUT to collect fail data based on a data processing module's activity level and a second threshold being met by an assigned memory buffer in accordance with embodiments of the present invention. The details of operation 515 (see FIG. 5A) are outlined in FIG. 5B.

At step 525, provided the "unused buffers" list contains at least one buffer, the DMA daemon module assigns the available memory buffer as an additional memory buffer to the DUT associated with the assigned memory buffer meeting the second buffer size threshold.

At step 530, the DMA daemon module communicates control signals to the DMA engine that instruct it to immediately collect fail data in the memory buffer assigned at step 525 for the DUT corresponding to the assigned memory buffer meeting the second buffer size threshold. Also, the DMA daemon module adds the memory buffer assigned at step 525 to the "contains data to be processed" list generated by the DMA daemon module at step 305 (see FIG. 3A).

At step 535, the DMA daemon module communicates control signals to the data processing module to process the fail data stored in the assigned memory buffer meeting the second buffer size threshold at step 505 (see FIG. 5A).

At step 540, the DMA engine monitors fail data gathered by the memory buffer assigned at step 525 to determine whether the buffer has met a second buffer size threshold. Upon a determination that the buffer has met a second buffer size threshold, the DMA engine generates an interrupt signal responsive to a detection of a second buffer size threshold being met by the assigned memory buffer, as detailed at step 505 (see FIG. 5A).

At step 555, a determination is made by the DMA engine as to whether the fail data stored in the assigned memory buffer meeting the second buffer size threshold at step 505 been processed by the data processing module. If the assigned memory buffer meeting the first buffer size threshold has not been processed, then the data processing module continues to process the fail data stored in the assigned memory buffer, as detailed at step 535. If the assigned memory buffer meeting the second buffer size threshold has been processed, then this memory buffer is then removed from the "contains data to be processed" list and subsequently added to the "unused buffer" list generated by the DMA daemon module at step 305 (see FIG. 3A), as detailed at step 550.

At step 550, the assigned memory buffer meeting the second buffer size threshold has been completely processed and, therefore, the assigned memory buffer is then removed by the DMA daemon module from the "contains data to be processed" list and subsequently added to the "unused buffers" list generated by the DMA daemon module at step 305 (see FIG. 3A).

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method of testing a device under test (DUT), said method comprising:
    assigning a buffer to each of a plurality of DUTs being tested;
    testing said plurality of DUTs and receiving fail data therefrom into said buffers;
    generating an interrupt responsive to a buffer size threshold of a respective buffer being met by a DUT during said testing;
    responsive to said interrupt and provided said buffer size threshold is low:
        provided a fail data processing module is idle, assigning a subsequent buffer to said DUT for receiving said fail data and adding said respective buffer to a work list of said fail data processing module;
    responsive to said interrupt and provided said buffer size threshold is low and said fail data processing module is busy, adjusting said buffer size threshold to a high value;
    responsive to said interrupt and provided said buffer size threshold is high and an idle list of available buffers comprises at least one available buffer, assigning an available buffer to said DUT for receiving said fail data; and
    responsive to said interrupt and provided said buffer size threshold is high and said idle list is empty, halting receipt of said fail data for said plurality of DUTs until said idle list comprises at least one available buffer.

2. The method as described in claim 1, wherein said assigning a subsequent buffer further comprises terminating receipt of said fail data in said respective buffer upon said buffer size threshold being met by said DUT.

3. The method as described in claim 1, wherein said adding said respective buffer to a work list further comprises sending control signals to said fail data processing module to process buffers from said work list.

4. The method as described in claim 1, wherein said generating an interrupt further comprises monitoring said fail data processing module to determine whether said fail data processing module is idle or busy responsive to said interrupt.

5. The method as described in claim 1, further comprising removing said respective buffer from said work list upon said fail data processing module completing processing of said fail data stored in said respective buffer.

6. The method as described in claim 5, wherein said removing further comprises adding said respective buffer to said idle list upon said fail data processing module completing processing of said fail data stored in said respective buffer.

7. The method as described in claim 1, wherein said high value is set approximately equal to a maximum buffer capacity level.

8. A system for testing a device under test (DUT), said system comprising: a testing engine operable to test a plurality of DUTs and store fail data received therefrom into a plurality of buffers corresponding to said plurality of DUTs, wherein said testing engine is operable to generate an interrupt responsive to a buffer size threshold of a respective buffer being met by a DUT during said test;

a fail data processing module operable to process fail data received from said plurality of DUTs;

a buffer assigning module operable to assign said plurality of buffers to each of said plurality of DUTs being tested, wherein said buffer assigning module is further operable to:

responsive to said interrupt and provided said buffer size threshold is low provided a fail data processing module is idle, assign a subsequent buffer to said DUT for receiving said fail data and add said respective buffer to a work list of said fail data processing module;

responsive to said interrupt and provided said buffer size threshold is low and said fail data processing module is busy, adjust said buffer size threshold to a high value;

responsive to said interrupt and provided said buffer size threshold is high and an idle list of available buffers comprises at least one available buffer, assign an available buffer to said DUT for receiving said fail data; and responsive to said interrupt and provided said buffer size threshold is high and said idle list is empty, halting receipt of said fail data for said plurality of DUTs until said idle list comprises at least one available buffer.

9. The system as described in claim 8, wherein said buffer assigning module is further operable to terminate receipt of said fail data in said respective buffer upon said buffer size threshold being met by said DUT.

10. The system as described in claim 8, wherein said buffer assigning module is further operable to send control signals to said fail data processing module to process buffers from said work list.

11. The system as described in claim 8, wherein said buffer assigning module is further operable to monitor said fail data processing module to determine whether said fail data processing module is idle or busy responsive to said interrupt.

12. The system as described in claim 8, wherein said buffer assigning module is further operable to remove said respective buffer from said work list upon said fail data processing module completing processing of said fail data stored in said respective buffer.

13. The system as described in claim 12, wherein said buffer assigning module is further operable to add said respective buffer to said idle list upon said fail data processing module completing processing of said fail data stored in said respective buffer.

14. The system as described in claim 8, wherein said high value is set approximately equal to a maximum buffer capacity level.

15. A method of testing a device under test (DUT), said method comprising:

assigning a buffer to each of a plurality of DUTs being tested;

testing said plurality of DUTs and receiving fail data therefrom into said buffers;

generating an interrupt responsive to a buffer size threshold of a respective buffer being met by a DUT during said testing; and responsive to said interrupt:

monitoring a fail data processor activity level;

monitoring an idle list of available buffers and a work list of said fail data processor;

assigning a subsequent buffer to said DUT for receiving said fail data based on said idle list, said work list, said buffer size threshold and said fail data processor activity level; and adjusting said buffer size threshold level to a different level for said respective buffer based on said buffer size threshold level being met and said fail data processor activity level.

16. The method as described in claim 15, wherein said assigning a subsequent buffer further comprises assigning said subsequent buffer to said DUT provided said fail data processor activity level is idle and said buffer size threshold is low.

17. The method as described in claim 16, wherein said assigning a subsequent buffer further comprises adding said respective buffer to said work list of said fail data processor.

18. The method as described in claim 15, wherein said adjusting said buffer size threshold level further comprises adjusting said buffer size threshold to a high value provided said buffer size threshold is low and said fail data processor activity level is busy.

19. The method as described in claim 18, wherein said high value is set approximately equal to a maximum buffer capacity level.

20. The method as described in claim 15, further comprising assigning an available buffer to said DUT for receiving said fail data provided said buffer size threshold is high and said idle list comprises at least one available buffer.

* * * * *